United States Patent Office 2,894,250
Patented July 7, 1959

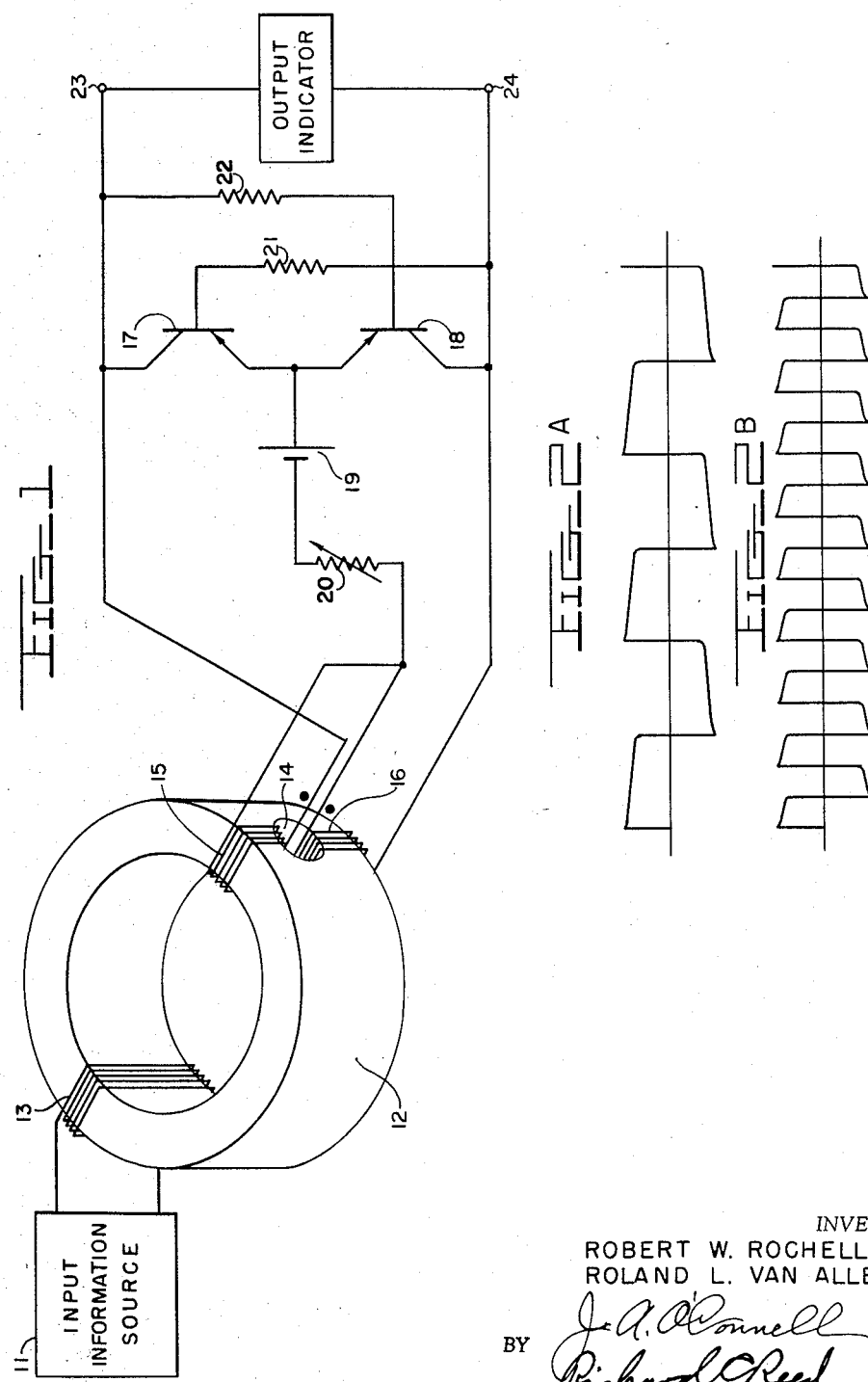
INVENTORS
ROBERT W. ROCHELLE
ROLAND L. VAN ALLEN

---

2,894,250

VARIABLE FREQUENCY MAGNETIC MULTIVIBRATOR

Robert W. Rochelle, Bucknell Manor, Va., and Roland L. Van Allen, Butler, Pa.

Application January 21, 1958, Serial No. 710,375

8 Claims. (Cl. 340—174)

(Granted under Title 35, U.S. Code (1952), sec. 266)

The invention described herein may be manufactured and used by or for the Government of the United States of America for governmental purposes without the payment of any royalties thereon or therefor.

This invention relates in general to information storage devices and in particular to magnetic information storage devices of the type employing material having a substantially rectangular hysteresis loop characteristic.

It will be appreciated that a compact assembly adapted to provide a reliable nonintegrating output in accordance with a variable input signal would be especially useful in unattended remote information detecting applications, for example, the earth satellite research program. In such applications it is sometimes desirable that the information be stored during one period and then continuously read out during a subsequent period via a communication network to the home base information collecting station. In addition, it is frequently desirable that the information storage device have minimum power requirement in order that the storage and readout processes may be continued over and extended time interval without servicing.

Accordingly;

It is an object of this invention to provide a reliable device for converting "peak current" information into an alternating voltage waveform, the frequency of which is proportional to the input information.

It is another object of this invention to provide a magnetic device capable of storing peak current information which permits nondestructive readout of the input information subsequent to the storage thereof.

It is a further object of this invention to provide a compact lightweight device for the storage and readout of input information.

It is still another object of this invention to provide a magnetic device which has minimum power requirements for the storage and readout of input information.

Other objects of this invention will become apparent upon a more comprehensive understanding of the invention for which reference is had to the following specification and drawings wherein:

Figure 1 is a diagrammatic and schematic showing of a preferred embodiment of the present invention;

Figures 2a and 2b are graphical showings of several output waveforms for the embodiment of Fig. 1.

Briefly, the device of this invention stores voltage information in a high remanence magnetic core of selected configuration and incorporates a novel magnetic multivibrator such that the flux level in the magnetic core controls the frequency of the multivibrator output within a predetermined frequency range. By controlling the flux level of the magnetic core in accordance with desired input information, the frequency of the multivibrator output is caused to vary in accordance with the input information.

Referring now to the drawings:

Fig. 1 depicts a preferred embodiment of the device of this invention in a typical remote observation application. In Fig. 1 an input information source 11, shown in block diagram for purposes of simplicity, is inductively coupled to the magnetic core 12 via the winding 13. The input information source 11 is illustrative of any device which produces a significant current output representative of a selected variable to be measured. In a solar observation application, for example, the source 11 might be an electrometer tube connected to an ion chamber which, in turn, measures a desired spectral line of impinging radaition at a determined geometric position in space. In such an application, the electrometer tube serves to amplify the minute current from the ion chamber to a useful magnitude. The amplified current flowing through the winding 13 on the core develops a magnetic field of sufficient magnitude to produce a change in the flux level of the core proportional to the minute current output of the ion chamber.

As shown in Fig. 1, the magnetic core 12 has a toroidal configuration and has a radial aligned aperture indicated at 14, in one section thereof. It will be noted that the diameter of the aperture is substantially less than the width of the toroid measured axially and that the core is divided into two side portions, one to either side of the aperture at 14. Thus the toroidal core 12 has a continuous flux path around the core. For purposes of this disclosure, the above said flux path shall be termed the "primary" flux path.

The core 12 is of the type having a substantially rectangular hysteresis loop characteristic and is commonly referred to as a high remanence magnetic core. For example, the core may be made of a solid ferromagnetic saturable material, such as 50% nickel-iron which is commercially available under the trade names "Orthonol," "Deltamax" or "Supermalloy," or it may be made of a spiral wound band of ferromagnetic saturable material with each layer insulated from coadjacent layers to form what is commonly termed a "tape wound core." The advantages of one type of magnetic core over another in the device of this invention will be considered hereinafter.

In accordance with this invention the magnetic core assumes a certain flux level for a given peak current flowing in the winding 13 and is unaffected by any subsequent currents of lesser magnitude than the previous peak current. Subsequent currents of greater magnitude will cause the core to assume a new flux level. That is, in the steady or storage state of this invention, the magnetic core does not integrate. It has been found that most types of high remanence toroid cores will respond as discussed above, provided the amount of current applied to the winding 13 does not exceed the amount of current required at saturation.

A two state multivibrator of the type described and claimed in the copending application Serial No. 694,058, entitled "A Square Wave Resistive Coupled Magnetic Multivibrator," which was filed in behalf of Robert W. Rochelle on or about November 1, 1957, is shown connected to the core 12 via the windings 15 and 16 which are each wound through the aperture indicated at 14. For a full and complete understanding of the operation of this type of multivibrator, reference is had to the abovementioned copending application.

In general explanation of the two state multivibrator, shown in the drawing the device involves a first conducting loop which includes the winding 15 and a second conducting loop which includes the winding 16. These first and second conducting loops are alternately operative by means of the PNP type transistors 17 and 18 respectively, which perform a switching function in the device of this invention.

As is well known in the art, in the operation of a PNP type transistor as an on-off switching element, the collector to emitter impedance of the transistor is very high when both the collector and emitter voltages are equal to or more negative than the base voltage. As soon as the base becomes slightly negative with respect to the emitter, however, the collector to emitter impedance drops to the vicinity of one ohm.

In Fig. 1 the emitter and base of the transistor 17 are connected, via voltage source 19 and resistance 20 in series, across the winding 16 and the emitter and base of the transistor 18 are connected via voltage source 19 and resistance 20 in series, across the other winding 15. The collectors of the transistors 17 and 18 are connected, as shown, to the windings 15 and 16, respectively, to complete the circuits in the two conducting loops. Thus, in each state, the polarity and magnitude of the voltage across one winding controls the on-off switch in the conducting loop which includes the other winding. The windings are wound on the core 12 through the aperture, indicated at 14, in opposite rotational sense to produce flux changes in opposite directions with respect to each other. The flux path for the field generated by current flow in the windings 15 and 16 is around the aperture indicated at 14, rather than around the entire core 12. For purposes of this disclosure the flux path for the windings 15 and 16 shall be termed the "secondary" flux path.

It will be seen that the voltage source 19 produces current flow in either of the two conducting loops as determined by the switching transistors 17 and 18. It is understood, of course, that it is not essential to the device of this invention that a common voltage source be employed and that separate voltage sources for the two conducting loops may be substituted, if desired. The resistance 20 also acts in either of the two conducting loops—to limit the current flow therein. Likewise, it is not essential to this invention that a common current limiting impedance be employed and separate impedances for the two conducting loops may be substituted, if desired.

In simple operational analysis of the multivibrator shown in Fig. 1, at the beginning of one state the flux in the secondary flux path is in one of the two saturation level conditions and the polarity of the winding 16 reduces the collector to emitter impedance of transistor 17 which, in turn, effectively applies the voltage source 19 via the resistance 20 across the winding 15 to cause current flow therein. At the same time the polarity of the winding 15 maintains the transistor 18 in the nonconducting state to prevent current flow in the winding 16. The current flow in the winding 15 produces a flux change in the opposite direction to that produced by the winding 16 in the previous state and the flux begins to return to the other saturation level condition. Once the other saturation level condition is reached the polarity of the winding 15 reduces the collector to emitter impedance of transistor 18 which, in turn, effectively applies the voltage source 19 via the resistance 20 across the winding 16 to cause current flow therein. Meanwhile, of course, the transistor 17 switches to its nonconduction state to block current flow in the winding 15. Thereupon the process repetitiously continues.

It will be noted that while the bases and collectors of the two transistors are interconnected to facilitate the alternate switching action, they are not directly cross coupled in the embodiment of Fig. 1. The addition of the interconnecting resistive impedances 21 and 22 decreases the loading effect of the transistors across the output terminals 23 and 24. Thus, while the impedances 21 and 22 are not essential and may be omitted, if desired, the result will be a lower output voltage.

The waveform depicted in Fig. 2a is illustrative of the output of the multivibrator exemplarily shown in Fig. 1. This square waveform represents the output of the multivibrator for the zero input condition, that is, for the unsaturated condition at the midpoint on the core hysteresis loop. It will be appreciated that the period of each half cycle of the waveform shown is directly dependent upon the value of the current limiting impedance 20. Thus, the output frequency of the multivibrator for the no input condition can be controlled by varying the value of the impedance 20. In the operation of the device of this invention, the prime function of the impedance 20 is to establish the low frequency limit for the output. In the described application of this invention, the frequency established by the impedance 20 is considered the reference frequency.

The waveform depicted in Fig. 2b is also illustrative of the output of the embodiment of this invention as shown in Fig. 1, but in another operational state. This square waveform represents the output of the multivibrator for the condition wherein the main core is partially saturated due to the magnetic field produced by current flow in the winding 13. It will be noted that the frequency of the waveform shown in Fig. 2b is greater than the frequency of the waveform shown in Fig. 2a. In accordance with the basic principle of this invention, the difference in frequency with respect to the reference frequency (Fig. 2a) is proportional to the saturation condition of the main core. Thus, the difference in frequency is indicative of the peak current input to the device from the input information source 11. It will be appreciated that the difference in frequency will increase as the peak input current applied, in proportion thereto.

As is well known in the art, the flux level in a magnetic core of the type employed in this invention will be maintained over an extended interval of time provided no magnetic field of greater magnitude or of opposing direction is applied to return the flux level to its original condition during this time interval. It has been assumed in the discussion above that a unidirectional input current has been applied to the winding 13 from the information source 11. Since the toroidal core shown is responsive only to current information of greater magnitude than the magnitude of any previous current information, it will be seen that the difference in frequency in the multivibrator output is indicative of the highest magnitude input current from the source 11.

It is understood, of course, that this invention is not limited to applications involving a unidirectional input current. The effect of an input current of reverse direction through the winding 13 would be a reversal in the direction of the magnetic field applied to the core 12. Provided the reverse magnetic field is of sufficient magnitude, the flux level will decrease in proportion to the reverse current flow in the winding 13. Just as in the first described instance, the change in flux level in the reverse direction is also representative of peak current flow in the winding 13. In other words, current of greater magnitude than the magnitude of any previous current information is required to change the flux level. Of course, a change in flux level in the reverse direction appears in the output of the multivibrator as a reduction in the frequency difference with respect to the reference frequency.

Considering now the composition of the core 12, it has been found that the tape wound core is generally preferred for applications involving frequencies in the region 1 to 20 kc. Solid cores may be satisfactorily employed at frequencies in the region 50–100 cycles, but as the operating frequency of the device increases, crosswise eddy current losses also increase and a practical limit soon appears which generally prohibits the use of solid cores at higher frequencies.

It is understood, of course, that this invention is not to be limited to the particular embodiment which has been exemplarily described and shown herein. For example, other high remanence two state magnetic multivibrators the output frequency of which is dependent upon the portion of the hysteresis loop involved during each state may be readily substituted for the magnetic multivibrator described in detail in this specification.

Finally, it is understood that this invention is to be limited only by the scope of the claims appended hereto.

What is claimed is:

1. A magnetic storage device for the storage and readout of desired information comprising a first winding on a magnetic core of the type having a substantially rectangular hysteresis loop characteristic, said magnetic core having a toroidal ring configuration and a radially aligned aperture in a first section of the toroidal ring, said first winding being wound on said toroidal ring core through the center thereof and encircling a second section of said toroidal ring core; first electrical energy means connected to said first winding and operative to change the flux level in the flux path around said toroidal ring in accordance with the desired information; a second winding wound on said toroidal ring core through said aperture therein and encircling the portion of said core to one side of the aperture; a third winding wound on said toroidal ring core through the aperture therein and encircling the portion of said core to the other side of said aperture; said second and third windings being wound in opposite rotational sense with respect to each other; second electrical energy means; plus first and second on-off switching means; said second winding, said second energy means and said first on-off switching means being serially connected to form a first current conductive loop; said third winding, said second energy means and said second on-off switching means being serially connected to form a second current conductive loop; said first and second current conductive loops being operative to change the flux level in the flux path around said aperture in opposite directions; means connecting said first switching means to said third winding and means connecting said second switching means to said second winding such that said first and second switching means are rendered alternately conductive in accordance with the voltage across said third and second windings, respectively; and frequency responsive output means operative in accordance with the frequency of the alternate operation of said first and second switching means.

2. A magnetic storage device for the storage and readout of desired information comprising a first winding on a magnetic core of the type having a substantially rectangular hysteresis loop characteristic, said magnetic core having a toroidal ring configuration and a radially aligned aperture in a first section of the toroidal ring, said first winding being wound on said toroidal ring core through the center thereof and encircling a second section of said toroidal ring core; first electrical energy means connected to said first winding and operative to change the flux level in the flux path around said toroidal ring in accordance with the desired information; a second winding wound on said toroidal ring core through said aperture therein and encircling the portion of said core to one side of the aperture; a third winding wound on said toroidal ring core through the aperture therein and encircling the portion of said core to the other side of said aperture; said second and third windings being wound in opposite rotational sense with respect to each other; second electrical energy means; plus first and second on-off transistor switching means; said second winding, said second energy means and said first on-off switching means being serially connected to form a first current conductive loop; said third winding, said second energy means and said second on-off switching means being serially connected to form a second current conductive loop; said first and second current conductive loops being operative to change the flux level in the flux path around said aperture in opposite directions; means connecting said first switching means to said third winding and means connecting said second switching means to said second winding such that said first and second switching means are rendered alternately conductive in accordance with the voltage across said third and second windings, respectively; and frequency responsive output means operative in accordance with the frequency of the alternate operation of said first and second switching means.

3. A magnetic storage device for the storage and readout of desired information comprising a first winding on a magnetic core of the type having a substantially rectangular hysteresis loop characteristic, said magnetic core having a toroidal ring configuration and a radially aligned aperture in a first section of the toroidal ring, said first winding being wound on said toroidal ring core through the center thereof and encircling a second section of said toroidal ring core; first electrical energy means connected to said first winding and operative to change the flux level in the flux path around said toroidal ring in accordance with the desired information; a second winding wound on said toroidal ring core through said aperture therein and encircling the portion of said core to one side of the aperture; a third winding wound on said toroidal ring core through the aperture therein and encircling the portion of said core to the other side of said aperture; said second and third windings being wound in opposite rotational sense with respect to each other; second electrical energy means; plus first and second on-off transistor switching means; said second winding, said second energy means and said first on-off switching means being serially connected to form a first current conductive loop; said third winding, said second energy means and said second on-off switching means being serially connected to form a second current conductive loop; said first and second current conductive loops being operative to change the flux level in the flux path around said aperture in opposite directions; means for rendering said first and second switching means alternately conductive in accordance with the flux level condition in the flux path around said aperture; and frequency responsive output means operative in accordance with the frequency of the alternate operation of said first and second switching means.

4. A magnetic storage device for the storage and readout of desired information comprising a first winding on a magnetic core of the type having a substantially rectangular hysteresis loop characteristic, said magnetic core having a toroidal ring configuration and a radially aligned aperture in a first section of the toroidal ring, said first winding being wound on said toroidal ring core through the center thereof and encircling a second section of said toroidal ring core; first electrical energy means connected to said first winding and operative to change the flux level in the flux path around said toroidal ring in accordance with the desired information; a second winding wound on said toroidal ring core through said aperture therein and encircling the portion of said core to one side of the aperture; a third winding wound on said toroidal ring core through the aperture therein and encircling the portion of said core to the other side of said aperture; said second and third windings being wound in opposite rotational sense with respect to each other; second electrical energy means; plus first and second on-off switching means; said second winding, said second energy means and said first on-off switching means being serially connected to form a first current conductive loop; said third winding, said second energy means and said second on-off switching means being serially connected to form a second current conductive loop; said first and second current conductive loops being operative to change the flux level in the flux path around said aperture in opposite directions; means for rendering said first and second switching means alternately conductive in accordance with the flux level condition in the flux path around said aperture, and frequency responsive output means operative in accordance with the frequency of the alternate operation of said first and second switching means.

5. A magnetic storage device for the storage and readout of desired information comprising a first winding on a magnetic core of the type having a substantially rectangular hysteresis loop characteristic, said magnetic core having a toroidal ring configuration and a radially aligned aperture in a first section of the toroidal ring, said first winding being wound on said toroidal ring core through the center thereof and encircling a second section of said toroidal ring core; first electrical energy means connected to said first winding and operative to change the flux level in the flux path around said toroidal ring in accordance with the desired information; a second winding wound on said toroidal ring core through said aperture therein; a third winding wound on said toroidal ring core through the aperture therein; said second and third windings being wound in opposite rotational sense with respect to each other; second electrical energy means; plus first and second on-off switching means; said second winding, said second energy means and said first on-off switching means being serially connected to form a first current conductive loop; said third winding, said second energy means and said second on-off switching means being serially connected to form a second current conductive loop; said first and second current conductive loops being operative to change the flux level in the flux path around said aperture in opposite directions; means connecting said first switching means to said third winding and means connecting said second switching means to said second winding such that said first and second switching means are rendered alternately conductive in accordance with the voltage across said third and second windings, respectively; and frequency responsive output means operative in accordance with the frequency of the alternate operation of said first and second switching means.

6. A magnetic storage device for the storage and readout of desired information comprising a winding on a magnetic core of the type having a substantially rectangular hysteresis loop characteristic, said magnetic core having a toroidal ring configuration and a radially aligned aperture in a first section of the toroidal ring, said winding being wound on said toroidal ring core through the center thereof and encircling a second section of said toroidal ring core; first flux level changing means connected to said first winding and operative to change the flux level in the flux path around said toroidal ring in accordance with the desired information; second and third flux level changing means for changing the flux level in the flux path around said aperture in opposite directions, respectively; means for energizing said second and third flux level changing means; switching means connected to said second and third flux level changing means and to said means for energizing such that said second and third flux changing means are alternately energized, said switching means being operative to alternately energize said second and third flux level changing means in response to a saturation flux level condition in said flux path around said aperture; and frequency responsive output means operative in accordance with the frequency of the alternate operation of said switching means.

7. The device as claimed in claim 5 wherein said magnetic core is of the tape wound core variety.

8. The device as claimed in claim 6 wherein said magnetic core is of the tape wound core variety.

References Cited in the file of this patent
UNITED STATES PATENTS

| | | |
|---|---|---|
| 2,777,076 | Perkins | Jan. 8, 1957 |
| 2,802,953 | Arsenault et al. | Aug. 13, 1957 |
| 2,854,580 | Uchrin et al. | Sept. 30, 1958 |